United States Patent
Bessenyei et al.

(10) Patent No.: US 11,941,567 B1
(45) Date of Patent: Mar. 26, 2024

(54) INFORMATION RETRIEVAL SYSTEM AND METHOD FOR ENVIRONMENTAL, SOCIAL AND GOVERNANCE (ESG) ANALYTICS

(71) Applicant: Richmond Global Sciences, Inc., Dover, DE (US)

(72) Inventors: Balazs Donat Bessenyei, Budapest (HU); Sotirios Kotsantonis, London (GB); Niklas Oskar Marinus Pape, London (GB); Sandor Palfy, Hingham, MA (US)

(73) Assignee: Richmond Global Sciences, Inc., Dover, DE (US)

( * ) Notice: Subject to any disclaimer, the term of this patent is extended or adjusted under 35 U.S.C. 154(b) by 0 days.

(21) Appl. No.: 17/942,159

(22) Filed: Sep. 11, 2022

(51) Int. Cl.
| | |
|---|---|
| G06Q 10/06 | (2023.01) |
| G06Q 10/0639 | (2023.01) |
| G06Q 40/06 | (2012.01) |
| H04L 67/10 | (2022.01) |

(52) U.S. Cl.
CPC ....... G06Q 10/06393 (2013.01); G06Q 40/06 (2013.01); H04L 67/10 (2013.01)

(58) Field of Classification Search
CPC .................................................. G06Q 10/06
USPC ....................................................... 705/7.39
See application file for complete search history.

(56) References Cited

U.S. PATENT DOCUMENTS

| | | | |
|---|---|---|---|
| 10,503,822 B1* | 12/2019 | Spencer ................. | G06F 40/197 |
| 2011/0106567 A1* | 5/2011 | Asher ..................... | G06Q 40/08 |
| | | | 715/764 |
| 2014/0136937 A1* | 5/2014 | Patel ....................... | G06F 40/18 |
| | | | 715/212 |
| 2016/0071043 A1* | 3/2016 | Naumov ............... | G06Q 10/067 |
| | | | 705/7.26 |
| 2016/0261577 A1* | 9/2016 | Chang ..................... | H04L 67/02 |
| 2018/0302393 A1* | 10/2018 | Mazur ................... | H04L 63/083 |
| 2019/0121847 A1* | 4/2019 | Castañeda-Villagrán ................... |
| | | | G06N 20/00 |
| 2020/0117636 A1* | 4/2020 | Nag ........................ | G06F 16/122 |
| 2021/0232536 A1* | 7/2021 | Nag ........................ | G06F 40/186 |
| 2021/0232537 A1* | 7/2021 | Nag ........................ | G06F 16/122 |

* cited by examiner

*Primary Examiner* — Nga B Nguyen
(74) *Attorney, Agent, or Firm* — David H. Judson

(57) ABSTRACT

A Software-as-a-Service infrastructure is provided to perform data analytics, wherein a given analytic is defined in a spreadsheet according to a formula, and wherein the formula is associated with an Environmental, Social and Governance (ESG) impact. The infrastructure comprises program code configured to receive a request, determine whether the request is associated with data of a first type and, if so, to clone the spreadsheet. The code is further configured to receive results from execution of the spreadsheet with respect to given data, and to provide the results for display in response to the request. The spreadsheet executes independently of execution of the computer program code.

16 Claims, 24 Drawing Sheets

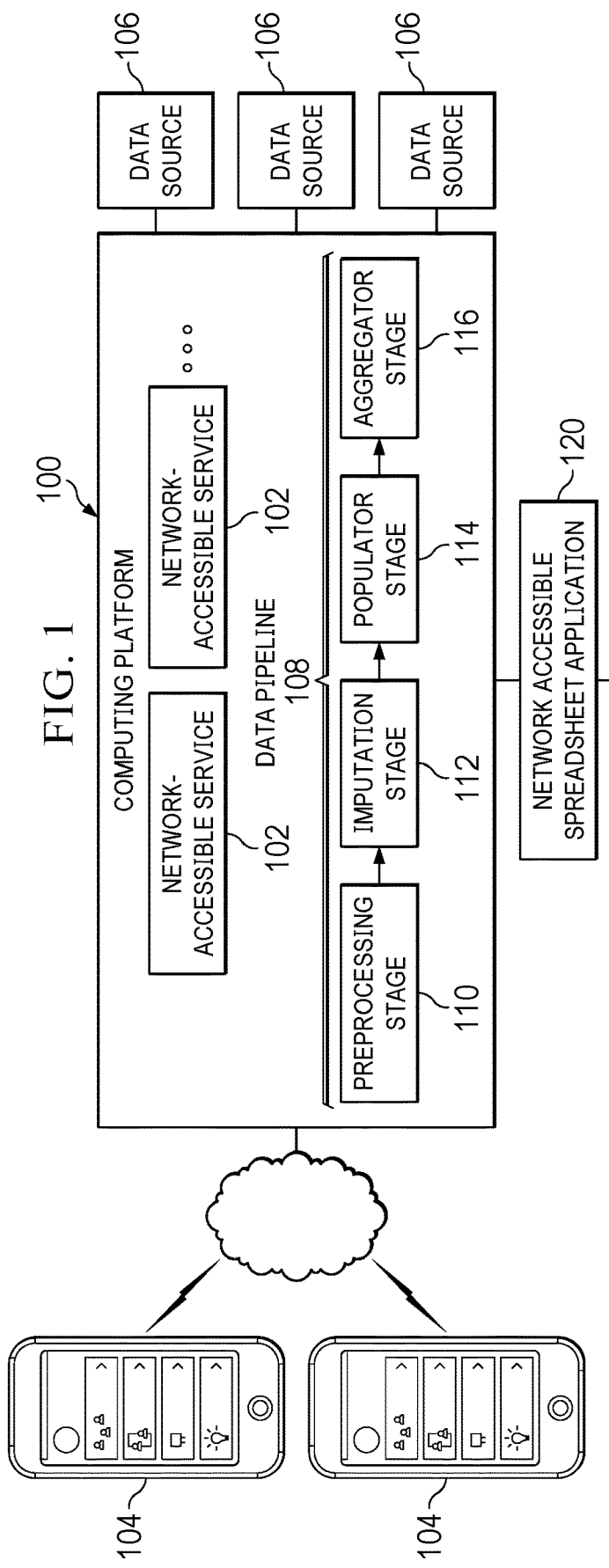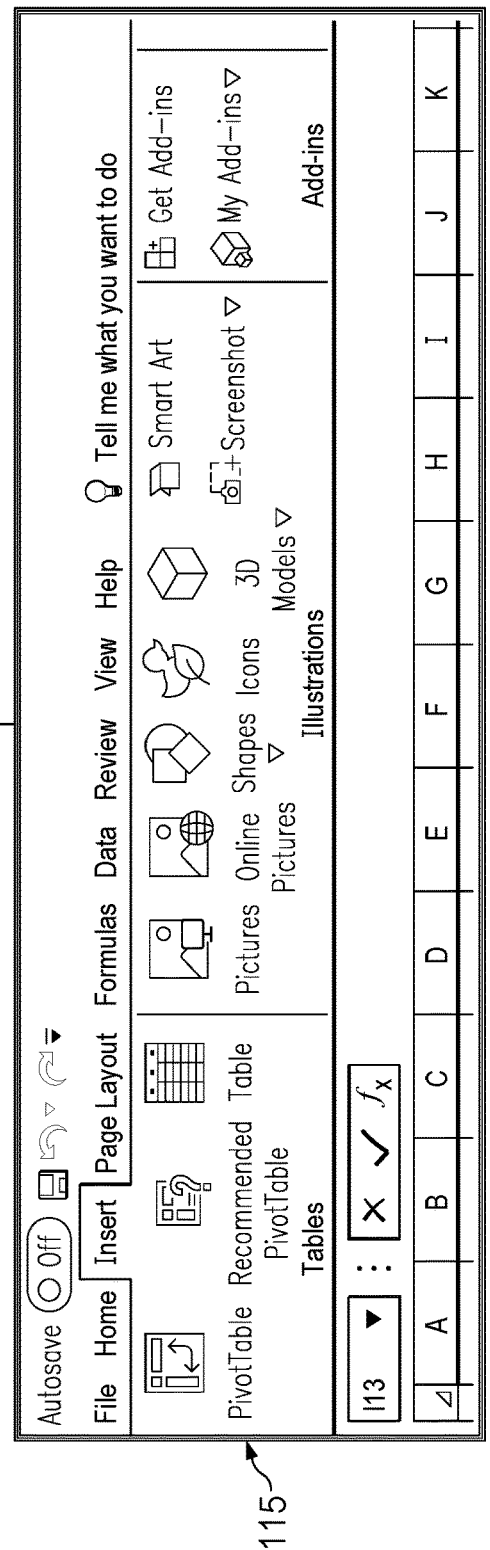
FIG. 1

TO FIG. 4B

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | 22,360 | 54,377 | 338,609 | 4,646 | | 0 |
| 5 | 27,854 | 48,635 | 322,863 | 449 | 1,284 | 0 |
| 6 | 27,332 | 34,211 | 328,889 | 497 | 1,208 | 0 |
| 7 | 29,950 | 34,884 | 329,025 | 432 | 1,184 | 0 |
| 8 | 24,929 | 32,562 | 256,172 | 402 | 892 | 0 |
| 9 | 359,188 | 1,181,538 | 339,675,730 | 29,850 | 233,022 | 20,250 |
| 10 | 357,284 | 1,222,218 | 327,059,347 | 30,262 | 236,809 | 20,253 |
| 11 | 369,381 | 1,260,499 | 338,139,021 | 50,126 | 275,691 | 32,224 |
| 12 | 369,840 | 1,217,414 | 349,070,066 | 42,027 | 228,154 | 27,017 |
| 13 | 372,366 | 1,164,512 | 339,243,502 | 37,529 | 231,757 | 28,970 |
| 14 | 540,093 | 1,509,501 | 6,740,100 | 32,311 | 302,918 | 68,661 |
| 15 | 22,688 | 185,844 | 1,320,095 | 9,054 | 42.357 | 0 |
| 16 | 21,122 | 172,447 | 1,238,770 | 1,099 | 0 | 0 |
| 17 | 19,024 | 161,969 | 1,218,180 | 991 | 0 | 0 |
| 18 | 17,971 | 153,058 | 967,614 | 1,074 | 0 | 0 |
| 19 | 16,250 | 140,330 | 737,707 | 1,076 | 0 | 0 |
| 20 | 11,762 | 122,331 | 574,503 | 747 | 0 | 0 |
| 21 | 10,043 | 114,867 | 1,655,724 | 8,467 | 9,081 | 0 |
| 22 | 9,083 | 108,013 | 1,157,240 | 4,765 | 9,117 | 0 |
| 23 | 9,890 | 96,595 | 375,102 | 1,504 | 711 | 0 |
| 24 | 8,913 | 87,277 | 339,094 | 1,763 | 948 | 0 |

FIG. 4A

| | M | N | O | P | Q | R | S | T |
|---|---|---|---|---|---|---|---|---|
| | | | | | CALCULATION AND OUTPUTS | | | |
| | Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| | 1.00 | 1.4410 | -12,014,854.92338 | -0.00149 | 0.00000 | 0.00000 | -12,014,854.92338 | -0.00149 |
| | 1.00 | 1.4410 | -8,748,014.29500 | -0.00107 | 0.00000 | 0.00000 | -8,748,014.29500 | -0.00107 |
| | 1.00 | 1.4410 | -8,719,768.01340 | -0.00107 | 0.00000 | 0.00000 | -8,719,768.01340 | -0.00107 |
| | 1.00 | 1.4410 | -7,015,888.59360 | -0.00081 | 0.00000 | 0.00000 | -7,015,888.59360 | -0.00081 |
| | 1.00 | 1.4410 | -7,391,084.20801 | -0.00087 | 0.00000 | 0.00000 | -7,391,084.20801 | -0.00087 |
| | 1.00 | 1.4410 | -6,553,974.00000 | -0.00098 | 0.00000 | 0.00000 | -6,553,974.00000 | -0.00098 |
| | 0.75 | 9.1490 | -175,642,767.32880 | -0.01827 | -1,398,469,214.37055 | -0.14550 | -1,574,111,981.69934 | -0.16377 |
| | 0.75 | 9.1490 | -180,063,273.38339 | -0.01911 | -1,346,526,664.63784 | -0.14292 | -1,526,589,938.02123 | -0.16204 |
| | 0.75 | 9.1490 | -185,806,347.73620 | -0.02042 | -1,392,142,474.49522 | -0.15297 | -1,577,948,822.23142 | -0.17338 |
| | 0.75 | 9.1490 | -180,946,960.27501 | -0.01942 | -1,437,146,366.37196 | -0.15422 | -1,618,093,326.64697 | -0.17363 |
| | 0.75 | 9.1490 | -175,204,079.90459 | -0.01852 | -1,396,689,700.24992 | -0.14767 | -1,571,893,780.15451 | -0.16619 |
| | 0.75 | 9.1490 | -233,699,310.18600 | -0.01874 | -27,749,472.56839 | -0.00223 | -261,448,782.75439 | -0.02097 |
| | 1.00 | 18.8458 | -23,886,649.18560 | -0.00130 | 0.00000 | 0.00000 | -23,886,649.18560 | -0.00130 |
| | 1.00 | 18.8458 | -22,066,866.84361 | -0.00117 | 0.00000 | 0.00000 | -22,066,866.84361 | -0.00117 |
| | 1.00 | 18.8458 | -20,633,194.97761 | -0.00106 | 0.00000 | 0.00000 | -20,633,194.97761 | -0.00106 |
| | 1.00 | 18.8458 | -19,497,285.93600 | -0.00121 | 0.00000 | 0.00000 | -19,497,285.93600 | -0.00121 |
| | 1.00 | 18.8458 | -17,850,152.49000 | -0.00141 | 0.00000 | 0.00000 | -17,850,152.49000 | -0.00141 |
| | 1.00 | 18.8458 | -15,286,602.00000 | -0.00152 | 0.00000 | 0.00000 | -15,286,602.00000 | -0.00152 |
| | 1.00 | 22.4094 | -14,239,743.11219 | -0.00063 | 0.00000 | 0.00000 | -14,239,743.11219 | -0.00063 |
| | 1.00 | 22.4094 | -13,348,963.16340 | -0.00067 | 0.00000 | 0.00000 | -13,348,963.16340 | -0.00067 |
| | 1.00 | 22.4094 | -12,139,295.14141 | -0.00054 | 0.00000 | 0.00000 | -12,139,295.14141 | -0.00054 |
| | 1.00 | 22.4094 | -10,965,691.73760 | -0.00050 | 0.00000 | 0.00000 | -10,965,691.73760 | -0.00050 |

FROM FIG. 4A

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |

FIG. 5A

| M | N | O | P | Q | R | S | T |
|---|---|---|---|---|---|---|---|
| | | | CALCULATION AND OUTPUTS | | | | |
| Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| 1.00 | 1.4410 | -12,014,854.92338 | -0.00149 | 0.00000 | 0.00000 | -12,014,854.92338 | -0.00149 |

FROM FIG. 5A

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | 22,360 | 54,377 | 338,609 | 4,646 | | 0 |
| 5 | 27,854 | 48,635 | 322,863 | 449 | 1,284 | 0 |
| 6 | 27,332 | 34,211 | 328,889 | 497 | 1,208 | 0 |
| 7 | 29,950 | 34,884 | 329,025 | 432 | 1,184 | 0 |
| 8 | 24,929 | 32,562 | 256,172 | 402 | 892 | 0 |
| 9 | 359,188 | 1,181,538 | 339,675,730 | 29,850 | 233,022 | 20,250 |
| 10 | 357,284 | 1,222,218 | 327,059,347 | 30,262 | 236,809 | 20,253 |
| 11 | 369,381 | 1,260,499 | 338,139,021 | 50,126 | 275,691 | 32,224 |
| 12 | 369,840 | 1,217,414 | 349,070,066 | 42,027 | 228,154 | 27,017 |
| 13 | 372,366 | 1,164,512 | 339,243,502 | 37,529 | 231,757 | 28,970 |
| 14 | 540,093 | 1,509,501 | 6,740,100 | 32,311 | 302,918 | 68,661 |
| 15 | 22,688 | 185,844 | 1,320,095 | 9,054 | 42.357 | 0 |
| 16 | 21,122 | 172,447 | 1,238,770 | 1,099 | 0 | 0 |
| 17 | 19,024 | 161,969 | 1,218,180 | 991 | 0 | 0 |
| 18 | 17,971 | 153,058 | 967,614 | 1,074 | 0 | 0 |
| 19 | 16,250 | 140,330 | 737,707 | 1,076 | 0 | 0 |
| 20 | 11,762 | 122,331 | 574,503 | 747 | 0 | 0 |
| 21 | 10,043 | 114,867 | 1,655,724 | 8,467 | 9,081 | 0 |
| 22 | 9,083 | 108,013 | 1,157,240 | 4,765 | 9,117 | 0 |
| 23 | 9,890 | 96,595 | 375,102 | 1,504 | 711 | 0 |
| 24 | 8,913 | 87,277 | 339,094 | 1,763 | 948 | 0 |

FIG. 6A

| M | N | O | P | Q | R | S | T |
|---|---|---|---|---|---|---|---|
| Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| | | | CALCULATION AND OUTPUTS | | | | |
| 1.00 | 1.4410 | -12,014,854.92338 | -0.00149 | 0.00000 | 0.00000 | -12,014,854.92338 | -0.00149 |

FROM FIG. 6A

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | 22,360 | 54,377 | 338,609 | 4,646 | | 0 |
| 5 | 27,854 | 48,635 | 322,863 | 449 | 1,284 | 0 |
| 6 | 27,332 | 34,211 | 328,889 | 497 | 1,208 | 0 |
| 7 | 29,950 | 34,884 | 329,025 | 432 | 1,184 | 0 |
| 8 | 24,929 | 32,562 | 256,172 | 402 | 892 | 0 |
| 9 | 359,188 | 1,181,538 | 339,675,730 | 29,850 | 233,022 | 20,250 |
| 10 | 357,284 | 1,222,218 | 327,059,347 | 30,262 | 236,809 | 20,253 |
| 11 | 369,381 | 1,260,499 | 338,139,021 | 50,126 | 275,691 | 32,224 |
| 12 | 369,840 | 1,217,414 | 349,070,066 | 42,027 | 228,154 | 27,017 |
| 13 | 372,366 | 1,164,512 | 339,243,502 | 37,529 | 231,757 | 28,970 |
| 14 | 540,093 | 1,509,501 | 6,740,100 | 32,311 | 302,918 | 68,661 |
| 15 | 22,688 | 185,844 | 1,320,095 | 9,054 | 42,357 | 0 |
| 16 | 21,122 | 172,447 | 1,238,770 | 1,099 | 0 | 0 |
| 17 | 19,024 | 161,969 | 1,218,180 | 991 | 0 | 0 |
| 18 | 17,971 | 153,058 | 967,614 | 1,074 | 0 | 0 |
| 19 | 16,250 | 140,330 | 737,707 | 1,076 | 0 | 0 |
| 20 | 11,762 | 122,331 | 574,503 | 747 | 0 | 0 |
| 21 | 10,043 | 114,867 | 1,655,724 | 8,467 | 9,081 | 0 |
| 22 | 9,083 | 108,013 | 1,157,240 | 4,765 | 9,117 | 0 |
| 23 | 9,890 | 96,595 | 375,102 | 1,504 | 711 | 0 |
| 24 | 8,913 | 87,277 | 339,094 | 1,763 | 948 | 0 |

FIG. 7A

| M | N | O | P | Q | R | S | T |
|---|---|---|---|---|---|---|---|
| | | | CALCULATION AND OUTPUTS | | | | |
| Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| 1.00 | 1.4410 | -12,014,854.92338 | -0.00149 | 0.00000 | 0.00000 | -12,014,854.92338 | -0.00149 |

FROM FIG. 7A

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | 22,360 | 54,377 | 338,609 | 4,646 | | 0 |
| 5 | 27,854 | 48,635 | 322,863 | 449 | 1,284 | 0 |
| 6 | 27,332 | 34,211 | 328,889 | 497 | 1,208 | 0 |
| 7 | 29,950 | 34,884 | 329,025 | 432 | 1,184 | 0 |
| 8 | 24,929 | 32,562 | 256,172 | 402 | 892 | 0 |
| 9 | 359,188 | 1,181,538 | 339,675,730 | 29,850 | 233,022 | 20,250 |
| 10 | 357,284 | 1,222,218 | 327,059,347 | 30,262 | 236,809 | 20,253 |
| 11 | 369,381 | 1,260,499 | 338,139,021 | 50,126 | 275,691 | 32,224 |
| 12 | 369,840 | 1,217,414 | 349,070,066 | 42,027 | 228,154 | 27,017 |
| 13 | 372,366 | 1,164,512 | 339,243,502 | 37,529 | 231,757 | 28,970 |
| 14 | 540,093 | 1,509,501 | 6,740,100 | 32,311 | 302,918 | 68,661 |
| 15 | 22,688 | 185,844 | 1,320,095 | 9,054 | 42.357 | 0 |
| 16 | 21,122 | 172,447 | 1,238,770 | 1,099 | 0 | 0 |
| 17 | 19,024 | 161,969 | 1,218,180 | 991 | 0 | 0 |
| 18 | 17,971 | 153,058 | 967,614 | 1,074 | 0 | 0 |
| 19 | 16,250 | 140,330 | 737,707 | 1,076 | 0 | 0 |
| 20 | 11,762 | 122,331 | 574,503 | 747 | 0 | 0 |
| 21 | 10,043 | 114,867 | 1,655,724 | 8,467 | 9,081 | 0 |
| 22 | 9,083 | 108,013 | 1,157,240 | 4,765 | 9,117 | 0 |
| 23 | 9,890 | 96,595 | 375,102 | 1,504 | 711 | 0 |
| 24 | 8,913 | 87,277 | 339,094 | 1,763 | 948 | 0 |

FIG. 8A

| M | N | O | P | Q | R | S | T |
|---|---|---|---|---|---|---|---|
| Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| | | | CALCULATION AND OUTPUTS | | | | |
| 1.00 | 1.4410 | -12,014,854.92338 | -0.00149 | 0.00000 | 0.00000 | -12,014,854.92338 | -0.00149 |
| 1.00 | 1.4410 | -8,748,014.29500 | -0.00107 | 0.00000 | | | |
| 1.00 | 1.4410 | -8,719,768.01340 | -0.00107 | 0.00000 | | | |
| 1.00 | 1.4410 | -7,015,888.59360 | -0.00081 | 0.00000 | | | |
| 1.00 | 1.4410 | -7,391,084.20801 | -0.00087 | 0.00000 | | | |
| 1.00 | 1.4410 | -6,553,974.00000 | -0.00098 | 0.00000 | | | |
| 0.75 | 9.1490 | -175,642,767.32880 | -0.01827 | -1,398,469,214.37055 | | | |
| 0.75 | 9.1490 | -180,063,273.38339 | -0.01911 | -1,346,526,664.63784 | | | |
| 0.75 | 9.1490 | -185,806,347.73620 | -0.02042 | -1,392,142,474.49522 | | | |
| 0.75 | 9.1490 | -180,946,960.27501 | -0.01942 | -1,437,146,366.37196 | | | |
| 0.75 | 9.1490 | -175,204,079.90459 | -0.01852 | -1,396,689,700.24992 | | | |
| 0.75 | 9.1490 | -233,699,310.18600 | -0.01874 | -27,749,472.56839 | | | |
| 1.00 | 18.8458 | -23,886,649.18560 | -0.00130 | 0.00000 | | | |
| 1.00 | 18.8458 | -22,066,866.84361 | -0.00117 | 0.00000 | | | |
| 1.00 | 18.8458 | -20,633,194.97761 | -0.00106 | 0.00000 | | | |
| 1.00 | 18.8458 | -19,497,285.93600 | -0.00121 | 0.00000 | | | |
| 1.00 | 18.8458 | -17,850,152.49000 | -0.00141 | 0.00000 | | | |
| 1.00 | 18.8458 | -15,286,602.00000 | -0.00152 | 0.00000 | | | |
| 1.00 | 22.4094 | -14,239,743.11219 | -0.00063 | 0.00000 | | | |
| 1.00 | 22.4094 | -13,348,963.16340 | -0.00067 | 0.00000 | | | |
| 1.00 | 22.4094 | -12,139,295.14141 | -0.00054 | 0.00000 | | | |
| 1.00 | 22.4094 | -10,965,691.73760 | -0.00050 | 0.00000 | | | |

FROM FIG. 8A

| | G | H | I | J | K | L |
|---|---|---|---|---|---|---|
| 1 | | | INPUTS | | | |
| 2 | Scope 1 Emissions | Scope 2 Emissions | Total Water Withdrawn | Total Waste Landfilled | Total Waste Recycled | Total Waste Incinerated |
| 3 | 35,280 | 70,113 | 346,155 | 5,294 | | 0 |
| 4 | 22,360 | 54,377 | 338,609 | 4,646 | | 0 |
| 5 | 27,854 | 48,635 | 322,863 | 449 | 1,284 | 0 |
| 6 | 27,332 | 34,211 | 328,889 | 497 | 1,208 | 0 |
| 7 | 29,950 | 34,884 | 329,025 | 432 | 1,184 | 0 |
| 8 | 24,929 | 32,562 | 256,172 | 402 | 892 | 0 |
| 9 | 359,188 | 1,181,538 | 339,675,730 | 29,850 | 233,022 | 20,250 |
| 10 | 357,284 | 1,222,218 | 327,059,347 | 30,262 | 236,809 | 20,253 |
| 11 | 369,381 | 1,260,499 | 338,139,021 | 50,126 | 275,691 | 32,224 |
| 12 | 369,840 | 1,217,414 | 349,070,066 | 42,027 | 228,154 | 27,017 |
| 13 | 372,366 | 1,164,512 | 339,243,502 | 37,529 | 231,757 | 28,970 |
| 14 | 540,093 | 1,509,501 | 6,740,100 | 32,311 | 302,918 | 68,661 |
| 15 | 22,688 | 185,844 | 1,320,095 | 9,054 | 42.357 | 0 |
| 16 | 21,122 | 172,447 | 1,238,770 | 1,099 | 0 | 0 |
| 17 | 19,024 | 161,969 | 1,218,180 | 991 | 0 | 0 |
| 18 | 17,971 | 153,058 | 967,614 | 1,074 | 0 | 0 |
| 19 | 16,250 | 140,330 | 737,707 | 1,076 | 0 | 0 |
| 20 | 11,762 | 122,331 | 574,503 | 747 | 0 | 0 |
| 21 | 10,043 | 114,867 | 1,655,724 | 8,467 | 9,081 | 0 |
| 22 | 9,083 | 108,013 | 1,157,240 | 4,765 | 9,117 | 0 |
| 23 | 9,890 | 96,595 | 375,102 | 1,504 | 711 | 0 |
| 24 | 8,913 | 87,277 | 339,094 | 1,763 | 948 | 0 |

FIG. 9A

| M | N | O | P | Q | R | S | T |
|---|---|---|---|---|---|---|---|
| | | | | CALCULATION AND OUTPUTS | | | |
| Company water discharge rate | Company AWARE Factor | Operational GHG Emissions | Operational GHG Emissions per $ of revenue | Operational Water Consumed | Operational Water Consumed per $ of revenue | Environmental Operational Impact | Environmental Operational Impact per $ of revenue |
| 1.00 | 1.4410 | -12,014,854.92338 | -0.00149 | 0.00000 | 0.00000 | -12,014,854.92338 | -0.00149 |
| 1.00 | 1.4410 | -8,748,014.29500 | -0.00107 | 0.00000 | 0.00000 | -8,748,014.29500 | -0.00107 |
| 1.00 | 1.4410 | -8,719,768.01340 | -0.00107 | 0.00000 | 0.00000 | -8,719,768.01340 | -0.00107 |
| 1.00 | 1.4410 | -7,015,888.59360 | -0.00081 | 0.00000 | 0.00000 | -7,015,888.59360 | -0.00081 |
| 1.00 | 1.4410 | -7,391,084.20801 | -0.00087 | 0.00000 | 0.00000 | -7,391,084.20801 | -0.00087 |
| 1.00 | 1.4410 | -6,553,974.00000 | -0.00098 | 0.00000 | 0.00000 | -6,553,974.00000 | -0.00098 |
| 0.75 | 9.1490 | -175,642,767.32880 | -0.01827 | -1,398,469,214.37055 | -0.14550 | -1,574,111,981.69934 | -0.16377 |
| 0.75 | 9.1490 | -180,063,273.38339 | -0.01911 | -1,346,526,664.63784 | -0.14292 | -1,526,589,938.02123 | -0.16204 |
| 0.75 | 9.1490 | -185,806,347.73620 | -0.02042 | -1,392,142,474.49522 | -0.15297 | -1,577,948,822.23142 | -0.17338 |
| 0.75 | 9.1490 | -180,946,960.27501 | -0.01942 | -1,437,146,366.37196 | -0.15422 | -1,618,093,326.64697 | -0.17363 |
| 0.75 | 9.1490 | -175,204,079.90459 | -0.01852 | -1,396,689,700.24992 | -0.14767 | -1,571,893,780.15451 | -0.16619 |
| 0.75 | 9.1490 | -233,699,310.18600 | -0.01874 | -27,749,472.56839 | -0.00223 | -261,448,782.75439 | -0.02097 |
| 1.00 | 18.8458 | -23,886,649.18560 | -0.00130 | 0.00000 | 0.00000 | -23,886,649.18560 | -0.00130 |
| 1.00 | 18.8458 | -22,066,866.84361 | -0.00117 | 0.00000 | 0.00000 | -22,066,866.84361 | -0.00117 |
| 1.00 | 18.8458 | -20,633,194.97761 | -0.00106 | 0.00000 | 0.00000 | -20,633,194.97761 | -0.00106 |
| 1.00 | 18.8458 | -19,497,285.93600 | -0.00121 | 0.00000 | 0.00000 | -19,497,285.93600 | -0.00121 |
| 1.00 | 18.8458 | -17,850,152.49000 | -0.00141 | 0.00000 | 0.00000 | -17,850,152.49000 | -0.00141 |
| 1.00 | 18.8458 | -15,286,602.00000 | -0.00152 | 0.00000 | 0.00000 | -15,286,602.00000 | -0.00152 |
| 1.00 | 22.4094 | -14,239,743.11219 | -0.00063 | 0.00000 | 0.00000 | -14,239,743.11219 | -0.00063 |
| 1.00 | 22.4094 | -13,348,963.16340 | -0.00067 | 0.00000 | 0.00000 | -13,348,963.16340 | -0.00067 |
| 1.00 | 22.4094 | -12,139,295.14141 | -0.00054 | 0.00000 | 0.00000 | -12,139,295.14141 | -0.00054 |
| 1.00 | 22.4094 | -10,965,691.73760 | -0.00050 | 0.00000 | 0.00000 | -10,965,691.73760 | -0.00050 |

FROM FIG. 9A

FIG. 9B

|   | K | L | M | N | O | P | Q |
|---|---|---|---|---|---|---|---|
| 1 | | | | | CALCULATION AND OUTPUTS | | |
| 2 | Total Waste Recycled | Total Waste Incinerated | Company water discharge rate | Company AWARE Factor | Operational GHG Emissions | Operational GHG Emissions per $ of revenue | Operational Water Consumed |
| 3 |  | 0 | 1.00 | 1.4410 | -12,014,854.92338 | -0.00149 | 0.00000 |
| 4 |  | 0 | 1.00 | 1.4410 | -8,748,014.29500 | -0.00107 | 0.00000 |
| 5 | 1,284 | 0 | 1.00 | 1.4410 | -8,719,768.01340 | -0.00107 | 0.00000 |
| 6 | 1,208 | 0 | 1.00 | 1.4410 | -7,015,888.59360 | -0.00081 | 0.00000 |
| 7 | 1,184 | 0 | 1.00 | 1.4410 | -7,391,084.20801 | -0.00087 | 0.00000 |
| 8 | 892 | 0 | 1.00 | 1.4410 | -6,553,974.00000 | -0.00098 | 0.00000 |
| 9 | 233,022 | 20,250 | 0.75 | 9.1490 | -175,642,767.32880 | -0.01827 | -1,398,469,214.37055 |
| 10 | 236,809 | 20,253 | 0.75 | 9.1490 | -180,063,273.38339 | -0.01911 | -1,346,526,664.63784 |
| 11 | 275,691 | 32,224 | 0.75 | 9.1490 | -185,806,347.73620 | -0.02042 | -1,392,142,474.49522 |
| 12 | 228,154 | 27,017 | 0.75 | 9.1490 | -180,946,960.27501 | -0.01942 | -1,437,146,366.37196 |
| 13 | 231,757 | 28,970 | 0.75 | 9.1490 | -175,204,079.90459 | -0.01852 | -1,396,689,700.24992 |
| 14 | 302,918 | 68,661 | 0.75 | 9.1490 | -233,699,310.18600 | -0.01874 | -27,749,472.56839 |
| 15 | 42,357 | 0 | 1.00 | 18.8458 | -23,886,649.18560 | -0.00130 | 0.00000 |
| 16 | 0 | 0 | 1.00 | 18.8458 | -22,066,866.84361 | -0.00117 | 0.00000 |
| 17 | 0 | 0 | 1.00 | 18.8458 | -20,633,194.97761 | -0.00105 | 0.00000 |
| 18 | 0 | 0 | 1.00 | 18.8458 | -19,497,285.93600 | -0.00121 | 0.00000 |
| 19 | 0 | 0 | 1.00 | 18.8458 | -17,850,152.49000 | -0.00141 | 0.00000 |
| 20 | 0 | 0 | 1.00 | 18.8458 | -15,286,602.00000 | -0.00152 | 0.00000 |
| 21 | 9,081 | 0 | 1.00 | 22.4094 | -14,239,743.11219 | -0.00063 | 0.00000 |
| 22 | 9,117 | 0 | 1.00 | 22.4094 | -13,348,963.16340 | -0.00067 | 0.00000 |
| 23 | 711 | 0 | 1.00 | 22.4094 | -12,139,295.14141 | -0.00054 | 0.00000 |
| 24 | 948 | 0 | 1.00 | 22.4094 | -10,965,691.73760 | -0.00050 | 0.00000 |
| 25 | 968 | 0 | 1.00 | 22.4094 | -9,863,203.73400 | -0.00061 | 0.00000 |
| 26 | 686 | 0 | 1.00 | 22.4094 | -13,039,409.49000 | -0.00090 | 0.00000 |
| 27 | 294,844 | 0 | 1.00 | 25.2986 | -182,056,499.64600 | -0.00719 | 0.00000 |
| 28 | 1,886 | 0 | 1.00 | 19.4945 | -5,558,767.46340 | -0.00049 | 0.00000 |
| 29 | 1,527 | 0 | 1.00 | 19.4945 | -4,456,597.34879 | -0.00048 | 0.00000 |
| 30 | 1,264 | 0 | 1.00 | 19.4945 | -4,028,313.92940 | -0.00040 | 0.00000 |
| 31 | 1,019 | 0 | 1.00 | 19.4945 | -3,940,559.58475 | -0.00040 | 0.00000 |
| 32 | 753 | 0 | 1.00 | 19.4945 | -3,054,530.05584 | -0.00033 | 0.00000 |
| 33 | 520 | 0 | 1.00 | 19.4945 | -2,540,697.25200 | -0.00052 | 0.00000 |
| 34 |  | 520 | 1.00 | 13.7927 | -5,043,961.60121 | -0.00055 | 0.00000 |
| 35 |  | 449 | 1.00 | 13.7927 | -4,564,521.09239 | -0.00054 | 0.00000 |

|  | R | S | T | U | V | W | X |
|---|---|---|---|---|---|---|---|
|  |  |  |  |  |  | \multicolumn{2}{c}{SDGS} |
|  | Operational Water Consumed per $ of revenue | Environmental Operational Impact | Environmental Operational Impact per $ of revenue | Carbon Footprint | Carbon Footprint per $ of revenue | SDG 6 per $ of revenue | SDG 6 |
| | 0.00000 | -12,014,854.92338 | -0.00149 | 105,393 | 0 | 0.00 | 0. |
| | 0.00000 | -8,748,014.29500 | -0.00107 | 76,737 | 0 | 0.00 | 0. |
| | 0.00000 | -8,719,768.01340 | -0.00107 | 76,489 | 0 | 0.00 | 0. |
| | 0.00000 | -7,015,888.59360 | -0.00081 | 61,543 | 0 | 0.00 | 0. |
| | 0.00000 | -7,391,084.20801 | -0.00087 | 64,834 | 0 | 0.00 | 0. |
| | 0.00000 | -6,553,974.00000 | -0.00098 | 57,491 | 0 | 0.00 | 0. |
| | -0.14550 | -1,574,111,981.69934 | -0.16377 | 1,540,726 | 0 | -0.15 | -1,398,469,214. |
| | -0.14292 | -1,526,589,938.02123 | -0.16204 | 1,579,502 | 0 | -0.14 | -1,346,526,664. |
| | -0.15297 | -1,577,948,822.23142 | -0.17338 | 1,629,880 | 0 | -0.15 | -1,392,142,474. |
| | -0.15422 | -1,618,093,326.64697 | -0.17363 | 1,587,254 | 0 | -0.15 | -1,437,146,366. |
| | -0.14767 | -1,571,893,780.15451 | -0.16619 | 1,536,878 | 0 | -0.15 | -1,396,689,700. |
| | -0.00223 | -261,448,782.75439 | -0.02097 | 2,049,994 | 0 | 0.00 | -27,749,472. |
| | 0.00000 | -23,886,649.18560 | -0.00130 | 209,532 | 0 | 0.00 | 0. |
| | 0.00000 | -22,066,866.84361 | -0.00117 | 193,569 | 0 | 0.00 | 0. |
| | 0.00000 | -20,633,194.97761 | -0.00106 | 180,993 | 0 | 0.00 | 0. |
| | 0.00000 | -19,497,285.93600 | -0.00121 | 171,029 | 0 | 0.00 | 0. |
| | 0.00000 | -17,850,152.49000 | -0.00141 | 156,580 | 0 | 0.00 | 0. |
| | 0.00000 | -15,286,602.00000 | -0.00152 | 134,093 | 0 | 0.00 | 0. |
| | 0.00000 | -14,239,743.11219 | -0.00063 | 124,910 | 0 | 0.00 | 0. |
| | 0.00000 | -13,348,963.16340 | -0.00067 | 117,096 | 0 | 0.00 | 0. |
| | 0.00000 | -12,139,295.14141 | -0.00054 | 106,485 | 0 | 0.00 | 0. |
| | 0.00000 | -10,965,691.73760 | -0.00050 | 96,190 | 0 | 0.00 | 0. |
| | 0.00000 | -9,863,203.73400 | -0.00061 | 86,519 | 0 | 0.00 | 0. |
| | 0.00000 | -13,039,409.49000 | -0.00090 | 114,381 | 0 | 0.00 | 0. |
| | 0.00000 | -182,056,499.64600 | -0.00719 | 1,596,987 | 0 | 0.00 | 0. |
| | 0.00000 | -5,558,767.46340 | -0.00049 | 48,761 | 0 | 0.00 | 0. |
| | 0.00000 | -4,456,597.34879 | -0.00048 | 39,093 | 0 | 0.00 | 0. |
| | 0.00000 | -4,028,313.92940 | -0.00040 | 35,336 | 0 | 0.00 | 0. |
| | 0.00000 | -3,940,559.58475 | -0.00040 | 34,566 | 0 | 0.00 | 0. |
| | 0.00000 | -3,054,530.05584 | -0.00033 | 26,794 | 0 | 0.00 | 0. |
| | 0.00000 | -2,540,697.25200 | -0.00052 | 22,287 | 0 | 0.00 | 0. |
| | 0.00000 | -5,043,961.60121 | -0.00055 | 44,245 | 0 | 0.00 | 0. |
| | 0.00000 | -4,564,521.09239 | -0.00054 | 40,040 | 0 | 0.00 | 0. |

Have more granular input about the business ⌄

This will give you about 25% more accuracy

Sparkling soft drinks ⓘ [      ] %

Hydration ⓘ [      ] %

Tea & Coffee ⓘ [      ] %

Energy drinks ⓘ [      ] %

Juices, smoothies, dairy ⓘ [      ] %

Other ⓘ [      ] %

2019 ⌃

2018 ⌃

+ Add year

Run the extra mile ⌃
If you have these, our ESG analysis will be extra solid Total volume of product sold ⓘ
[      Liters ⌄ ]

Sugar purchased for manufacturing ⓘ
[      Tons ⌄ ]

Plastic purchased for packaging ⓘ
[      Tons ⌄ ]

( Get analysis )

FIG. 14

ESG Risks & Operations

| 👍 Circular Economy And Zero-Waste Initiatives | 👎 Extended Producer Liability Costs For Plastics | 👍 Achieving Net-Zero Targets | 👎 Carbon Taxes |
| --- | --- | --- | --- |
| 👍 Long-Term Security Of Vital Operational Input | 👎 Inability To Operate On Depleted Water Supplies | 👍 Proactive Compliance With Data Security & Privacy Laws | 👎 Litigation From Customers With Exposed Personal Information |
| 👍 Reduced Turnover Of Employees | 👎 Loss Of Talent To Competitors | 👍 Diverse Representation In Company & Leadership | 👎 Breach Of Anti-Discrimination Laws |

Screening for ESG issues

Impact History

Total RIFT Impact | Total Environmental Impact | Total Social Impact (Line chart: Per $ of revenues, y-axis −0.4 to 0.4, x-axis 2015–2019)

Total Product Impact vs Total Operational Impact 0.11 Operational Impact

−0.08 Product Impact

Industry Benchmark

○ ACME Corp.

● Test Corporation (Social impact axis)

Comparison Analysis
Select companies to compare Company 9 with

| Company 1 | Company 2 | Company 3 |
| Company 4 | Company 5 | Company 6 |
| Company 7 | Company 8 | Company 9 |
| Company 10 | Company 11 | Company 12 |

Compare selected

FIG. 16

INFORMATION RETRIEVAL SYSTEM AND METHOD FOR ENVIRONMENTAL, SOCIAL AND GOVERNANCE (ESG) ANALYTICS

TECHNICAL FIELD

This disclosure relates generally to technologies for delivering actionable intelligence for private and public markets.

BACKGROUND OF THE RELATED ART

Socially responsible investing is an investment strategy that seeks to consider both financial return and social/environmental good to bring about positive social change. Socially responsible investors encourage corporate practices that they believe promote environmental stewardship, consumer protection, human rights, and racial or gender diversity. Some SRIs avoid investing in businesses perceived to have negative social effects. The areas of concern recognized by the SRI practitioners are sometimes summarized under the heading of ESG issues: environment, social justice, and corporate governance.

Techniques for objectively scoring companies on a combination of environmental, social, and governance (ESG) matters and in a manner that permits side-by-side comparison across industries and over time have been described in the art. One example system and method is described in U.S. Publication No. 2022/0027814. In this system, a number of objective metrics for creating a score to evaluate a company on environmental, social, and governance issues based on a materiality map that identifies one or more environmental, social, and governance issues relevant to an industry for the company are selected. Historical data for the number of objective metrics are then obtained from one or more commercial data providers. The score is then calculated at a number of different times and based on the historical data. Calculating the score includes normalizing all of the objective metrics to be a figure of merit positively correlated to more favorable performance in the industry for the company. A change in the score is measured over time. The change is then applied as a factor, for example, in making a decision to purchase or sell shares in the company.

In another prior art approach, described in U.S. Publication No. 2021/0256084, an information platform is provided to integrating and quantifying ESG principles into financial analyses, analytical tools, metrics, and/or available information on reviewed companies, business entities, and the like. The platform also provides integration of analysis with community-based insight, contextual information and tools. In this approach, machine learning tools are used to curate data sources and to incorporate the data sources into the platform. Using this platform, a search display for accessing information associated with a plurality of companies or entities is provided. The display accepts user input and searches an information knowledge base responsive to the user input. The user can provide additional input to curate any data element shown as a result of the search of the information knowledge base. A search output may comprise different data types including qualitative, quantitative, and interactive information. The platform facilitates user understanding and can eliminate the need to design and execute complicated queries by allowing users to transition between data types and views to develop better understanding and context of various information sources.

Still another known approach provides for an ESG rating system that scores companies based on ESG data. In this approach, described in U.S. Publication No. 2016/0117774, the scoring system identifies the ESG data for companies within a group of companies. The scoring system calculates individual company ESG scores from the ESG data and weights the company ESG scores based on proportions of the group of companies. The scoring system then generates a group ESG score based on the weighted company ESG scores for the group of companies. The rating system may calculate the company ESG scores based on different data categories, such as environmental related data, social related data, and governance related data.

The world of ESG has evolved rapidly over the last 20 years. More than 90% of S&P 500 companies published sustainability reports in 2021, compared to 45% in 2002. Alongside this trend, multiple data providers have developed offerings assessing the ESG performance of these companies. While the progress in transparency around ESG practices is substantial, certain questions remain around the applications of such information. The primary reason is that the plethora of ESG metrics make the assessment and comparison of real impact across companies and sectors nearly impossible. One might argue that such comparisons are impossible given the vast differences across sectors and business models. But, the reality is that are ways to compare fundamentally different businesses. In particular, the prevalent accounting frameworks have allowed standardization, irrespective of what the business model is, or how the operations of a firm are structured. Comparisons have been made possible, e.g., by using revenues, market capitalization, gross margins, and other financial metrics.

Similarly, it is also known to convert ESG issues to monetized impacts, or "impact-weighted" accounts. Impact-weighted accounts are line items on a financial statement, such as an income statement or a balance sheet, supplementing a company's financial performance, to reflect their positive and negative impacts on employees, customers, the environment and broader society. Investors, managers, consumers, employees and other stakeholders need impact weighted accounts to benchmark companies, decide where to invest, which products to buy and where to potentially work. The known approaches, however, as represented by the example publications described above, have not meet this need.

BRIEF SUMMARY

A Software-as-a-Service infrastructure is provided to perform data analytics, wherein a given analytic is defined in a spreadsheet according to a formula, and wherein the formula is associated with an Environmental, Social and Governance (ESG) impact. The infrastructure comprises program code configured to receive a request, determine whether the request is associated with data of a first type and, if so, to clone the spreadsheet. The code is further configured to receive results from execution of the spreadsheet with respect to given data, and to provide the results for display in response to the request. The spreadsheet executes independently of execution of the computer program code.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 1 depicts a representative cloud-based computing platform of this disclosure;

FIGS. 4A-4B, 5A-5B, 6A-6B, 7A-7B, 8A-8B, 9A-9B and 10A-10B together depict a representative spreadsheet computation implemented by the cloud-based spreadsheet application; and FIGS. 11-17 depict a representative end user experience (UX) during an interaction with the back-end analytics infrastructure of this disclosure.

DETAILED DESCRIPTION OF AN ILLUSTRATIVE EMBODIMENT

Figure 2:
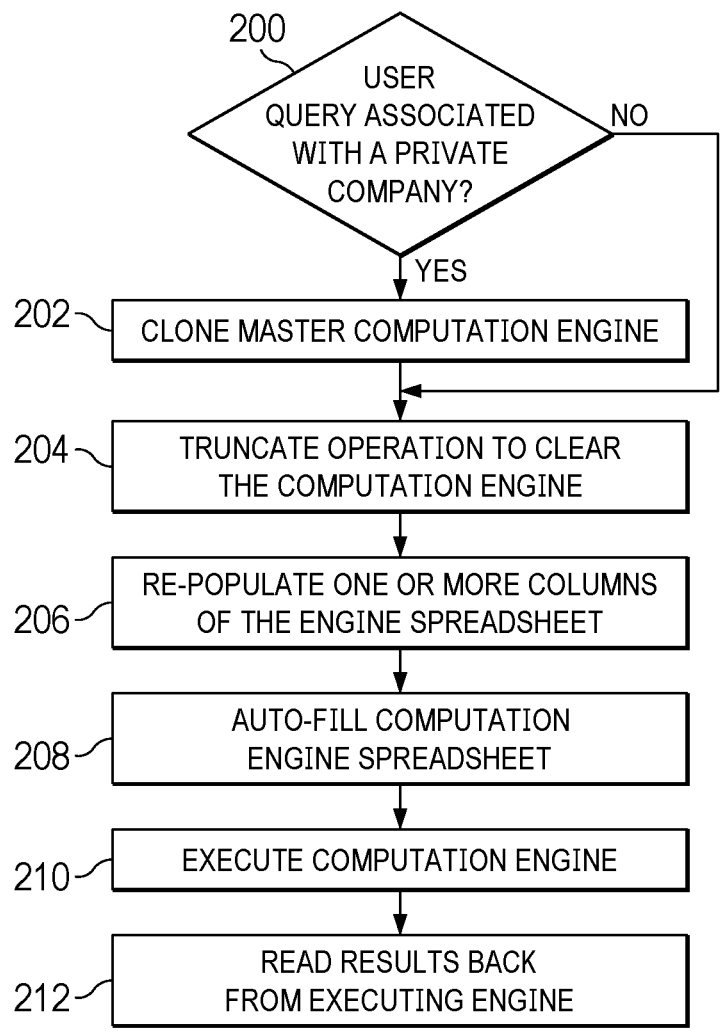
FIG. 2 depicts a process flow of this disclosure describing the computation of one or more impacts associated with a set of ESG data.

Referring now to FIG. 1, a computing platform 100 of this disclosure typically is managed and operated "as-a-service," e.g., by a cloud-based service provider entity. This is not a requirement, however, as the platform may be supported on-premises, or in a private-public hybrid cloud. In generally, the computing platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. As will be described, the computing platform typically comprises a set of applications (e.g., a data pipeline sub-system, a cloud-based spreadsheet, a workspace, and the like) 102 implemented as network-accessible services. One or more applications (services) may be combined with one another. An application (service) may be implemented using a set of computing resources that are co-located or themselves distributed. In addition, one or more of the identified components may interoperate with some other enterprise computing system or application.

Generalizing, one or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Participating end users 104 typically interact with the service using a web browser executing on a laptop, desktop or other workstation, although this is not a limitation, as an end user may view content on any computing device, such as a mobile device (smartphones and tablets), a Web-connected appliance, and the like. In a typical use case, an end user accesses the service using a mobile device that comprises a CPU (central processing unit), computer memory, such as RAM, and a drive. The device software includes an operating system (e.g., Apple iOS, Google® Android™, or the like), and generic support applications and utilities. A mobile device executes a browser, browser plug-in, or dedicated mobile app that provides a user interface. Typically, the mobile device app connects to the server environment providing the "service" in a secure manner, e.g., via a TLS-secured connection, and must be authenticated (or otherwise authorized) into a collaboration session.

As also depicted in FIG. 1, the computing platform has access to (or may incorporate) one or more data sources 106. Depending on use case, the data sources may be public data, e.g., published or otherwise readily-accessible data about public companies, private data, e.g., data about a private company and that is not necessarily published or otherwise available from public sources, or a combination of both public and private data. Whether public or private, typically the data is associated with one or ESG-related metrics associated with a company or a group of companies. This data is used to facilitate actionable insights for decision-making. The following describes an example use case wherein the platform provides for an easily accessible, cost-effective, self-service Software-As-A-Service (SaaS) solution to provide impact data insights and analytics to manage ESG due diligence, ESG performance monitoring, and regulatory reporting. In particular, and using the platform, ESG data is translated (typically using a series of calculations, with formulas specific to each industry) into monetary values for easy comparison across industries and impact dimensions, thereby facilitating actionable insights for decision-making. In this example, an impact intelligence platform is provided to simplify ESG for both private and public markets. The platform enables user (e.g., investors, managers, consumers, employees and other stakeholders) to understand ESG risks and opportunities, and also to quantify holistic impact of investments to maximize positive impact on the environment, and on society.

In a particular example, assume that a user desires to use the information exchange platform to analyze a product impact within a given sub-industry, e.g., soft drinks. This analysis may comprise analysis of social impact, and environmental impact. Social impact may comprise one or more metrics, such as customer welfare, product quality and safety (does the product have unintended malfunctions that pose health or safety risks to end users?), and accessibility (is the product accessible to underserved populations?). Customer welfare may be direct (what are the key benefits from consuming the good or service?) or indirect (does the product cause welfare internalities that customers are not fully aware of, e.g., medical and productivity costs associated with the overconsumption of sugar?). Environment impact may comprise one or more metrics, such as environmental use (what are the environmental costs and benefits from a product's use?), and end of life (what are the environmental costs and benefits from product disposal?). The above metrics and factors are merely representative. According to this embodiment, the data sources 106 comprise a taxonomy of product groups and associated key impact drivers available to the platform. Continuing with this example, assume that the sub-industry "Soft Drinks" has key product impact drivers such as Product Type. With respect to the product, one or more impact pillars, such as Sugar and Plastic, may be defined. In this example, Sugar is the sugar content of the given product, and it has a social impact (impact on consumer health), while Plastic refers to the amount of plastic used to package the product, which impacts the environment. The Product Groups identified by the taxonomy may be, for example, Sparkling Soft Drinks, Hydration, Juice, Tea & Coffee, and Energy. According to the methodology, outcome-driven environmental and social metrics (e.g., product portfolio, grams of sugar per $ of revenue, grams of plastic per $ of revenue, etc.) are identified in the data sources 106. Monetization logic (e.g., price elasticity of demand for the product portfolio, social cost of sugar for the grams of sugar per $ of revenue, and social cost of plastic for the grams of plastic per $ of revenue, etc.) is then built. Typically, this logic is expressed in monetary values using a set of formulas and, as will be described, preferably these formulas are accessed via a network-accessible spreadsheet application. Continuing with this example, and to compute a social impact, assume that the price elasticity of demand and the social cost of sugar are combined in a formula that computes a social impact per $ of revenue; to compute an environmental impact, assume that the social cost of plastic is expressed in a formula that computes an environmental impact per $ of revenue. Then, preferably the social impact per $ of revenue and environment impact per $ of revenue computations are themselves combined into a total impact weighted metric (per $ of revenue), sometimes referred to herein as a "Real Impact in Financial Terms." Generalizing, the Real Impact in Financial Terms of a Company may be described as a monetized (as expressed in $ terms) ESG and impact.

In operation, an authorized end user accesses the platform, formulates a query, and executes that query. The query is then processed against the knowledge base, and one or more outputs, e.g., a Real Impact in Financial Terms metric, is provided to the requesting end user by the system.

Without intending to be limiting, and as the example above reflects, there may be one or more different types of impact frameworks (models), and these frameworks may be based on "operational" impacts, or "non-operational" impacts. Example of operational impacts with respect to a product may include, without limitation, data related to the product's manufacture, such as greenhouse gas (GHG) emissions, water consumption, air pollution, waste, employment-related factors (wage quality, diversity, equal opportunity, unemployment, location impact, etc.) and the like. Non-operational impacts typically include social and environmental metrics, and product impact (customer welfare, product quality and safety, accessibility, and the like). These characterizations are not intended to be limiting. During processing, these frameworks (and thus the data therein) may be combined or processed independently. For example, and in one embodiment, product, employment and environmental impact frameworks are combined in a unified model, and analytics derived therefrom. As further depicted in FIG. 1, and in this embodiment, preferably data from the data sources 106 is processed according a data pipeline 108 comprising a set of stages: a preprocessing stage 110, an imputation stage 112, a populator stage 114, and an aggregator stage 116. As depicted, the output of each stage forms the input to a next stage. One or more of the stage(s) may be combined. Each of the data pipeline stages is now described.

In particular, the data supplied from the data sources 106 (possibly on a framework-specific basis) is supplied to the preprocessing stage 110, which performs various operations such as restructuring the data, culling unnecessary data, transforming data where necessary, filtering data, and combining data. The imputation stage 112 receives the output(s) from the preprocessing stage 110 and operates to fill-in data that is not present in the one or more data sources directly but may still be needed for computations. The populator stage 114 receives the data set(s) output from the imputation stage, and it provides for a data enrichment function that reorders the data sets to facilitate their use in association within the context of a network-accessible spreadsheet application. In particular, and as will be described below, preferably the platform implements actual computations within the network-accessible spreadsheet application itself (as opposed to directly in code). As will be described, this computational paradigm—wherein much of the actual processing occurs in a spreadsheet—provides significant advantages and, in particular, by providing a scalable, highly-available and reliable solution for multiple concurrent users. To that end, the populator stage 114 operates to restructure the data (e.g., renaming data columns, reordering columns, and the like) and to populate the restructured data into one or more calculation spreadsheets 115 that are managed by a network-accessible spreadsheet application 120. Typically, a calculation spreadsheet implements one or more "impact" computations, wherein a particular impact computation typically is implemented as a spreadsheet formula. The particular detail of a spreadsheet formula is not a limitation of this disclosure. A spreadsheet used in this manner is sometimes referred to as a computation engine. Data is populated into a given spreadsheet by the populator stage 114. In one example, the data that populates a spreadsheet 115 comprises given impact data from a company or a set of companies. In the case of a query involving a public company, typically the impact data is associated with a set of public companies, with each row in the spreadsheet being associated with a given public company and being independent from any other row. For private company data, the rows of the spreadsheet typically represent data for just the private company itself, with each row corresponding to a different company-year.

The flowchart in FIG. 2 represents an operation of the aggregator stage 116. In general, this stage configures the computation engine, executes the computation(s) in a spreadsheet, aggregates data resulting from such computation(s), and generates the output(s) that are then returned to the requesting end user. In particular, typically the output(s) are supplied from the aggregator stage and via the spreadsheet API to a populate a web page that is delivered to (or updated for) a requesting end user. To this end, the process depicted in FIG. 2 performs an initial test at step 200 to determine if a user query is associated with a private company. Private company data typically is unavailable to the system in advance. If the outcome of the test at step 200 indicates that the query relates to a private company, the system continues at step 202 to clone a master version of a particular computation engine (spreadsheet) at issue. Cloning is advantageous as it isolates a workspace associated with the query (and thus the user) so that computations can then proceed independently with respect to a query (and a data set associated therewith). Cloning also facilitates concurrency, enabling multiple end users to interact with the system (and with respect to the private data set(s)) at the same time. Following the cloning operation, control then continues at step 204, which step is also reached when the outcome of the test at step 200 is negative. Step 200 will have a negative outcome when the query relates to a public company or a particular sector/industry/sub-industry. As noted above, and given the ready availability of public data, when the end user query involves data available from public data sources, preferably the system has available public data set(s) in advance. There may be thousands or more data sets (corresponding to respective thousands of public companies) in a particular spreadsheet.

Referring back to FIG. 2, at step 204, and regardless of whether the query relates to a public company or to data associated with a private company, the system typically performs a truncation operation that removes all previous data from all rows in the spreadsheet. In other words, the truncation operation clears the spreadsheet (computation engine) at issue. Then, and at step 206, the system (the populator) automatically re-populates one or more inputs columns with the data that will be acted upon by the sheet's computation formula. Thereafter, at step 208, an auto-filling operation is performed. Auto-filling ensures that the formula is then applied to each row of the spreadsheet. As the computation engine executes (applies the calculations) at step 210, one or more output columns of the spreadsheet are then populated (filled in) with results data. At step 212, the results are read back, aggregated as necessary, and then returned. For the private company scenario, the output results are output in a web page (or as an updated page) delivered to the requesting end user. This completes the processing.

The following provides additional details regarding the how the system interoperates with the spreadsheet application during the cloning operation. This interoperation typically occurs over an Application Programming Interface (API) associated with the spreadsheet application. When a spreadsheet computation is required (e.g., in response to a query), the system issues a data insertion call over the API to create a new empty spreadsheet (the clone) that will be used for a computation. In the usual case, the spreadsheet is copied from a prior spreadsheet that already includes data. The truncation operation clears the data, although the basic skeleton of the spreadsheet (structure, layout, column name, headers, formulas, etc.) is maintained intact. Via the API, the populator then enters the new data (from the query or otherwise) into the cloned spreadsheet, and the calculation(s) then execute automatically in the spreadsheet, as previously described.

Typically, computations that are performed with respect to a query regarding a private company (or, more generally, on private data) is carried out in a linearly-independent manner with respect to each row of the spreadsheet. As noted above, a row of data in this context typically relates to some time period, such as a year. The cloning operation of the computation engine occurs on-the-fly as the user executes a query, and preferably there is a single computation engine per end user. As noted, the computation engine is cleared and then re-populated with necessary data for the computation, which (after the auto-fill) then proceeds automatically, with the results then populated back into the spreadsheet. The isolation providing from cloning enables scalability and security, because it ensures that separate sheets (computation engines) do not have access to each other (unless granted explicitly) and that multiple such computation engines can execute concurrently. Therefore, individual users cannot view or access each other's private data. In contrast, and with respect to a query involving public data, the cloning operation is not required, although typically the query involves the same operations 204, 206, 208, 210 and 212 as previously described. For the public company case, typically the clean-up, populate, calculate (which occurs automatically in the networked spreadsheet application), and read back the results operations occur off-line, independently of user interactions. For the public case, calculations are run infrequently, e.g., when new data comes into the system, when a formula is changed, or the like. In contrast, and in the private company scenario, the above-described operations occur each time a user starts a new calculation and thus are executed in real-time as a response to user interactions.

Figure 3:
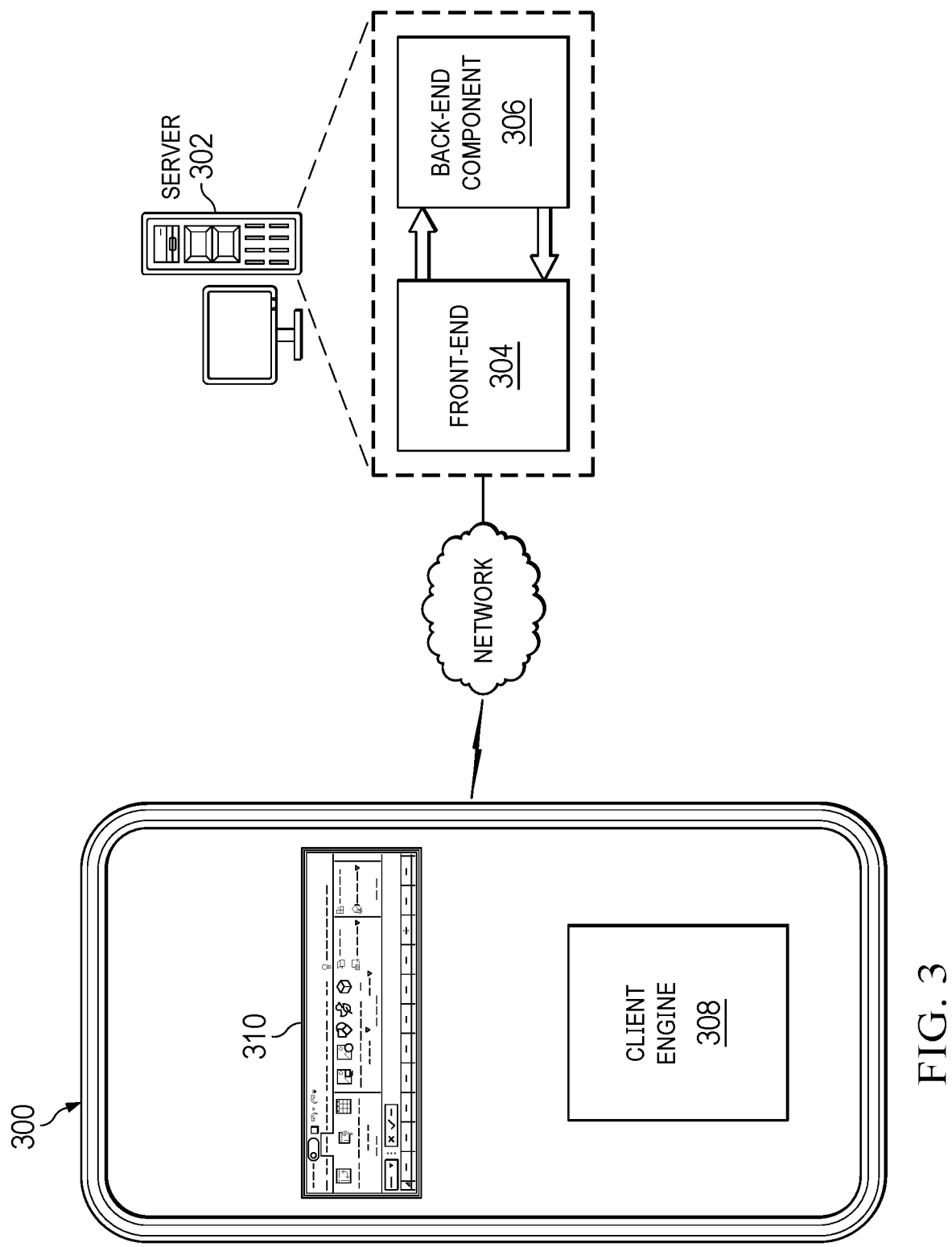
FIG. 3 depicts an cloud-based spreadsheet application for use in the computing platform.
Figure 11:
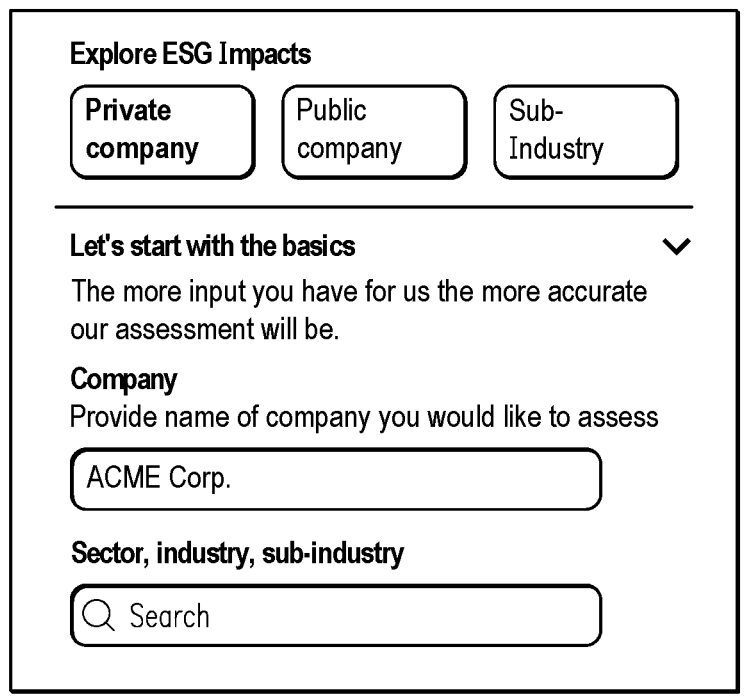

FIG. 3 depicts a cloud-based spreadsheet implemented as a distributed web application and that is implemented as part of the computing platform and SaaS-based information service of this disclosure. In this approach, portions of the distributed application execute at a client 300, and at a server 302, with the server implemented in the cloud. In this example embodiment, client 300 is a mobile device. This is not a limitation. In operation, assume client 300 requests the spreadsheet application from the server 302 and, in response, the server 302 transmits portions of the spreadsheet application for local execution the client. In this manner, the online spreadsheet application executes as a distributed application. In this example, a spreadsheet server 302 includes a front-end component 304 and a back-end component 306. The front-end and back-end may use other data exchange formats, such as JSON, for interactions. The front-end component typically is a web or XML server to which clients interface. In operation, the web server receives HTTP or HTTP/S requests from the client and, in response, transmits XML data. The back-end component 306 performs processing required by the spreadsheet application, such as the calculation of functions required to update a spreadsheet. In this system, portions of the online spreadsheet application may execute within the client. In particular, the client side of the distributed application may comprise a client engine 308 and a user interface 310. The client engine 308 may be implemented in script, e.g., JavaScript, that is downloaded from the server 302. The user interface 310 is typically displayed in a web browser as HTML and style sheets supplied from the client engine 308. In one implementation, the client-side operation of the online spreadsheet application may be implemented using AJAX (Asynchronous JavaScript And XML), although this is not a limitation.

In operation, a user at client 300 initiates a spreadsheet application session, e.g., using a web browser. The user may be required to have previously registered or created an account with and be logged into the server 302. In response to the user initiating a spreadsheet session, the server delivers the client engine to the client, although some portion of the client engine may be cached at the client from a previous session. After loading, the client engine presents a user interface that may include a graphical user interface of a spreadsheet. In an alternative and preferred approach, the end user client does not interact directly with the back-end server but instead does so through an intermediary service provider. In this alternative approach, the service provider creates and edits the calculation spreadsheets; the end user accesses the data on these spreadsheets via the service provider's own servers. In this latter approach, and as explained, end users do not see the spreadsheet(s); rather, they enter data (e.g., via a web interface) and receive the calculation results through the same interface, typically structured as an analytics UI. A representative UI is depicted in FIGS. 11-17, described below.

A spreadsheet comprises rows and columns in a known manner and, as noted above, the service provider defines the one or more formulas that act on the data that is populated into the spreadsheet cells.

A representative networked spreadsheet application of the type described above is Google® Sheets. This application is a cloud-based spreadsheet solution with real-time collaboration and tools to visualize, process and communicate data. A Google Sheet (or, more generally, a network-accessible spreadsheet) consists of one or more sheets, and each sheet is a 2D grid of cells into which text, numbers, links, or other values can be stored. A group of one or more adjacent cells is a range. The application provides an REST-based Application Programming Interface (API) that reads and modifies a spreadsheet's data. Although Google Sheets is a typical implementation, this is not a limitation, as other similar commercially-available solutions (such as Microsoft® Excel® for the Web) may be used. Also, depending on implementation, the spreadsheet functionality herein may operate offline, using Microsoft® Excel® or LibreOffice® software. When Google Sheets is used as the spreadsheet application, the Google API method used to clear previous values (step 204) is spreadsheets.values.clear, and the Google API method used to copy the formulas to multiple rows (pulling down or "auto-fill") is autoFillRequest.

According to this disclosure, the cloud-based spreadsheet solution is configured as a calculation engine to provide significant advantages over a conventional approach of doing the same calculations in program code (e.g., in Python or some other programming language). In particular, the approach here is declarative; instead of having researchers model their formulas in a spreadsheet and then writing down the definitions for programmers to implement, these steps are combined. In the approach herein, and as has been described, the researcher/developer defines the required calculations as spreadsheet formulas, and no additional implementation in a traditional software program is then needed, because the formulas are used directly in the spreadsheet itself. In the approach herein, only the filling and reading back of the data (to and from the spreadsheet) are coded. The approach herein enables the researcher to change a formula in a sheet and see how it changes the result instantly. In contrast to known systems wherein computations are hard-coded into the software, there is no need to change the code, test it, and then re-run. These improvements, in turn, result in much faster turnaround times for new changes, and they eliminate errors that might otherwise occur by not describing steps correctly after modeling or not implementing those described steps correctly.

Preferably, the private company data computations are carried out with respect to a sub-industry classification model, although this is not a limitation. In operation, the user picks a sub-industry. The site provides the user with one or more parameters and prompts the user to enter responsive source data. The data that is received is then used to populate the spreadsheet in the manner previously described.

Typically, there is one computation sheet for each of a set of formula, and one or more sheets may be associated with a given ESG metric.

With the above-described approach, multiple users can execute similar calculations at the same time, even with respect to the same private data set.

In a representative embodiment, the computing platform is web-based and is accessible from a secure web site. The computing platform comprises one or more machines operating in a cluster of such machines to ensure scalability, reliability and availability. The user accesses the platform using a web browser over a secure connection. The networked spreadsheet application may comprise part of the computing platform, or it may accessible from the platform via an API call. In an alternative embodiment, one or more portions of the computing platform or spreadsheet-based computation engine executes on-premises or in a stand-alone manner. The secure web site accessible from the computing platform supports one or more web pages with interactivity via one or more display elements, such as fill-in forms, drop boxes, selection buttons, and the like. By entering data into the display elements, the user formulates and executes a query, which query is then executed against the public and/or private data, with the result(s) then output. The web site may provide one or more document templates, or display type element templates, to facilitate the query processing.

FIGS. 4A-4B depict an example of the spreadsheet-based computation above-described operation of a query with respect to a private company. In this example, a spreadsheet for an environmental framework computation is depicted, in this example with input columns directed to Scope 1 emissions, Scope emissions, Total Water Withdrawn, Total Waste Recycled, and Total Waste Incinerated. A another set of columns depicts a set of calculations and outputs, in this example: Company Water Discharge Rate, Company AWARE Factor, Operational GHG Emissions, Operational GHG Emissions per $ of revenue, Operational Water Consumed, Operational Water Consumed per $ of revenue, Environmental Operational Impact, and Environmental Operational Impact per $ of revenue. FIGS. 5A-5B depicts the display after the truncation operation, with the first row corresponding to the underlying formula. FIGS. 6A-6B depict the re-population of the input data. FIGS. 7A-7B depict the state of the display as the back-end spreadsheet component performs the necessary computations, with the progress bar at the top right indicates the status. As computations are completed for the one or more rows, the resulting data is populated to the display as depicted in FIGS. 8A-8B. Once the calculations are compiled as indicated in FIGS. 9A-9B, the results are read back via the Google Sheets API, and the results are then displayed on the website to the user as depicted in FIGS. 10A-10B.

For the private company query, the operations depicted in FIGS. 4A-4B, 5A-5B, 6A-6B, 7A-7B, 8A-8B, 9A-9B and FIG. 10A-10B occur in real-time, with the computations and results limited to just the company; for the public company query, the operations depicted in FIGS. 4A-4B, 5A-5B, 6A-6B, 7A-7B, 8A-8B, 9A-9B and FIG. 10A-10B can occur in an off-line manner results are output in batch and typically apply to multiple public companies. In either case, the above-depicted operations as shown in these figures (as the spreadsheet is cleared, re-populated, auto-filled, executed to generate the results that are then saved) are not necessarily exposed to the end user directly, but this is not a requirement.

Figure 12:
Figure 15:
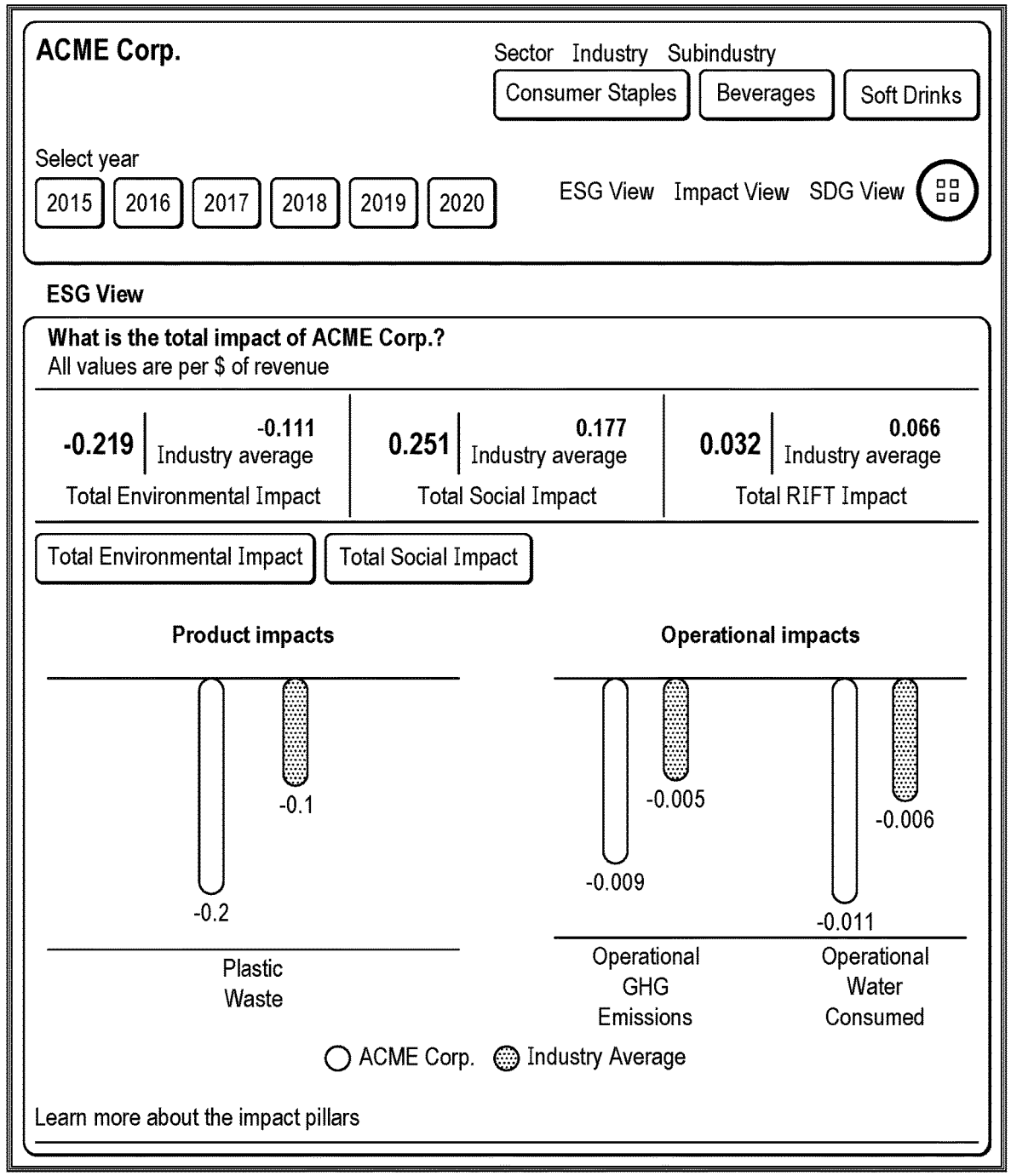
Figure 17:
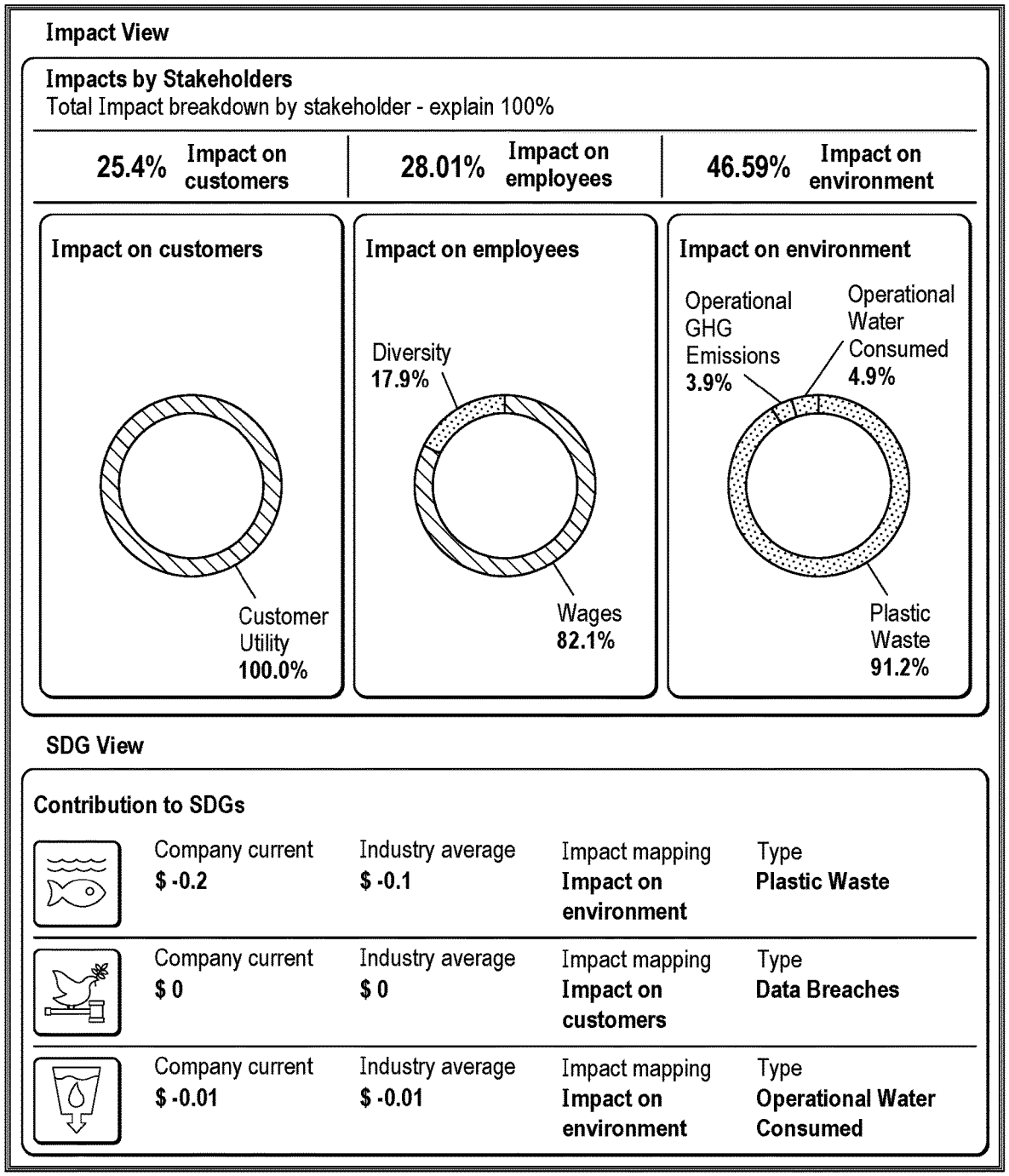

FIGS. 11 through 17 depict a representative user experience (UX) (© 2022, Richmond Global Sciences, Inc.) for a mobile device user interaction with the Software-as-a-Service data analytics platform described above. To this end, at FIG. 11, the user is presented with a page or panel and is offered an opportunity to initiate a query to explore ESG impacts associated with a Company. In this example, the user has selected to query the back-end with respect to a Private Company, and the name of the Company (e.g., Acme Corp.) is entered. As depicted, the user may also select a Sector, Industry or Sub-Industry to which the Company is associated. As depicted in FIG. 12, a page or panel may be displayed to the user to facilitate the selection. After entry of the Sector, Industry or Sub-Industry, the user is prompted to enter Basic Financial Details, such as main revenue-generating region, as well as total revenue. This is depicted at FIG. 13. As depicted in FIG. 14, additional display panels may be provided to enable the user to enter more fine-grained input data about the Private Company. In this example, the Private Company is a drink manufacturer, and the user is prompted to provide various additional inputs such as revenue percentages per product group, total volume of product sold, amount of sugar purchased for manufacturing, amount of plastic purchased for packaging, and so forth. These are just representative examples. After the user enters the data input, the back-end analytics platform is queried in the manner previously described. In particular, and because this query involves a Private Company, the spreadsheet is first cloned to ensure privacy and security of the private data, In the case of a Private Company. The spreadsheet is then executed (e.g., as shown in FIGS. 4-9). The results of the execution are then returned to the user interface at the mobile device. For example, at FIG. 15 the user receives a Summary View (at top) and can then select to review the results in various ways. In particular, and in this example, the user may select an ESG view, an Impact View, or an SDG (Sustainability Development Goals) view. The ESG view is depicted in the bottom half of FIG. 15. The top portion of FIG. 16 depicts ESG Risks & Opportunities shown in a summary form. The bottom portion of FIG. 16 depicts an Impact View, and the user may select to view Total RIFT Impact, Total Environment Impact, or Total Social Impact. The view also shows a Total Product Impact versus Total Operational Impact graph, as well as an Industry Benchmark graph. As also shown, the user can select one or more (Public) companies with which the results of Acme Corp. May then be compared. FIG. 17 at the top shows an Impacts by Stakeholders view with various charts for Impact on Customers, Impact on employees, and Impact on environment. The bottom portion of FIG. 17 depicts a portion of the SDG view as selected from the main results panel.

In one embodiment, a cloud service provider provides the above-described information service, together with one or more ancillary services such as identity and access management.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

The computing entity on which the browser and its associated browser plug-in (or other functionality) run may be any network-accessible computing entity that is other than the mobile device that runs the authenticator app itself. Representative entities include laptops, desktops, workstations, Web-connected appliances, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, as well as improvements to various technologies, all as described.

The platform provides significant advantages. As has been described, the information exchange platform provides for an easily accessible, cost-effective, self-service Software-As-A-Service (SaaS) solution to provide impact data insights and analytics to manage ESG due diligence, ESG performance monitoring, and regulatory reporting. Using the platform, and as has been described, ESG data is translated into monetary values for easy comparison across industries and impact dimensions, thereby facilitating actionable insights for decision-making. Actionable insights can then be integrated into other financial models, enabling easy cross-industry comparison. The approach preferably relies on concrete outcome metrics (rather than inputs or intentions) to measure companies' direct environmental impacts instead of assessing environmental policies. Leveraging the sub-industry paradigm, the methodology aligns with respected approaches, such as the Impact Weighted Accounts Initiative (IWAI). As also described above, preferably the methodology is implemented in a web-accessible, highly available, scalable and reliable technology platform that eliminates acquisition costs and provides advance impact data insights and analytics to enable the user to manage due diligence, portfolio monitoring and management, and reporting all within a single end-to-end SaaS-based ESG impact platform.

Without intending to be limiting, the populator stage as described above may be augmented such that one or more additional data mapping operations may be applied to data sets before being processed in a computational engine in the platform. Such mapping operations may be based on a classification system, such as The Global Industry Classification Standard (GICS®) classification system, or on a classification system that maps one or more product groups to that classification system. Data mapping in this manner enables revenues to be mapped to a product group, including at a geographical and sub-industry level(s).

As used herein, the notion of a "private" company refers to an enterprise that is not listed in a public stock exchange.

Having described the subject matter, what is claimed is as follows.

The invention claimed is:

1. A Software-as-a-Service infrastructure to perform data analytics, wherein a given analytic is associated with an Environmental, Social and Governance (ESG) impact, comprising:
   a set of hardware processors;
   computer memory holding computer program code executed by the one or more hardware processors, the computer program code comprising code configured to:
      receive a request;
      in response to determining that the request is associated with data of a first type, and in lieu of computing the given analytic directly in program code executing on the set of hardware processors, issue a call to a spreadsheet computation engine in a network-accessible spreadsheet application, the spreadsheet computation engine having a formula associated with the ESG impact and configured to compute the given analytic directly in a spreadsheet;
      as the request is pending, receive computation results from execution by the spreadsheet computation engine of the given analytic directly in the spreadsheet, the computation results having been generated by the spreadsheet computation engine automatically clearing data from a prior instantiation of the spreadsheet, re-populating input data to the spreadsheet, auto-filling the formula to each of the rows of the spreadsheet, and executing one or more computations on the input data; and
      provide the computation results for display in response to the request;
   wherein the computer program code executes independently of the network-accessible spreadsheet application.

2. The Software-as-a-Service infrastructure as described in claim 1 wherein the data of a first type is data associated with a private company.

3. The Software-as-a-Service infrastructure as described in claim 2 wherein the request is associated with a query concerning the private company.

4. The Software-as-a-Service infrastructure as described in claim 1 wherein the computation results are provided in real-time in response to receipt of the request.

5. The Software-as-a-Service infrastructure as described in claim 1 wherein the spreadsheet is cloned from a prior spreadsheet.

6. The Software-as-a-Service infrastructure as described in claim 1 wherein each row of the spreadsheet is associated with a time period and for one of:
   a sub-industry, and a given company.

7. The Software-as-a-Service infrastructure as described in claim 1 wherein a result associated with each row of the spreadsheet is computed independently of any other row.

8. The Software-as-a-Service infrastructure as described in claim 1 wherein the computer program code is further configured to clone an additional instance of the spreadsheet in response to receipt of a second request.

9. The Software-as-a-Service infrastructure as described in claim 8 wherein the request and the second request are received and processed concurrently.

10. The Software-as-a-Service infrastructure as described in claim 1 wherein the results are displayed in a web page.

11. The Software-as-a-Service infrastructure as described in claim 10 wherein the computer program code is further configured to pre-process the given data to generate pre-processed data.

12. The Software-as-a-Service infrastructure as described in claim 11 wherein the computer program code is further configured to impute the pre-processed data to generate imputed data.

13. The Software-as-a-Service infrastructure as described in claim 12 wherein the computer program code is further configured to enrich the imputed data to generate the given data.

14. The Software-as-a-Service infrastructure as described in claim 1 wherein the results include a monetized ESG and impact metric.

15. The Software-as-a-Service infrastructure as described in claim 1 wherein the results include a monetized ESG and impact metric associated with a sub-industry.

16. The Software-as-a-Service infrastructure as described in claim 1 wherein the sub-industry is defined in association with an industry classification system.

* * * * *